(12) United States Patent
Takauchi et al.

(10) Patent No.: US 8,886,352 B2
(45) Date of Patent: Nov. 11, 2014

(54) ELECTRONIC SEWING MACHINE

(75) Inventors: Mitsuyoshi Takauchi, Yamagata (JP); Keiichi Niizeki, Yamagata (JP); Toshikazu Matsuura, Yamagata (JP)

(73) Assignee: Happy Industrial Corporation (JP)

( * ) Notice: Subject to any disclaimer, the term of this patent is extended or adjusted under 35 U.S.C. 154(b) by 0 days.

(21) Appl. No.: 14/002,041

(22) PCT Filed: Jan. 26, 2012

(86) PCT No.: PCT/JP2012/051642
§ 371 (c)(1),
(2), (4) Date: Aug. 28, 2013

(87) PCT Pub. No.: WO2012/117776
PCT Pub. Date: Sep. 7, 2012

(65) Prior Publication Data
US 2013/0333604 A1    Dec. 19, 2013

(30) Foreign Application Priority Data

Feb. 28, 2011   (JP) ................. 2011-042256

(51) Int. Cl.
*D05B 19/00*   (2006.01)
*D05B 81/00*   (2006.01)

(52) U.S. Cl.
CPC ...... *D05B 19/006* (2013.01); *G05B 2219/2626* (2013.01); *D05B 19/00* (2013.01); *D05B 81/00* (2013.01); *D05D 2205/14* (2013.01); *D05D 2205/12* (2013.01)
USPC ......................................... 700/136

(58) Field of Classification Search
CPC ........ D05B 19/12; D05B 19/10; D05B 19/08; G05B 2219/2626; G05B 2219/44195
USPC ............. 112/470.01, 470.04, 470.05, 470.06; 700/136, 137, 138
See application file for complete search history.

(56) References Cited

U.S. PATENT DOCUMENTS 4,256,047 A * 3/1981 Suzuki et al. ................. 112/444
4,481,507 A * 11/1984 Takiguchi et al. ............ 340/679

(Continued)

FOREIGN PATENT DOCUMENTS

JP          1-34638      7/1989
JP          6-339587    12/1994

(Continued)

OTHER PUBLICATIONS

International Search Report for International application No. PCT/JP2012/051642 mailed Mar. 27, 2012.

*Primary Examiner* — Danny Worrell
(74) *Attorney, Agent, or Firm* — Merchant & Gould P.C.

(57) ABSTRACT

An electronic sewing machine (M) which makes a needle bar move up and down through a sewing machine spindle which is driven by a sewing machine motor of the sewing machine body provided with an illustration data storage unit (15) which stores a plurality of illustration data, a display unit (4) which displays the illustration data which is stored in the illustration data storage unit, an audio data storage unit (20) which stores audio data which corresponds to the illustration data, and an audio output unit (21) which outputs audio data which is stored in the audio data storage unit and displaying the illustration data on the display unit while outputting audio data corresponding to the illustration data from the audio output unit. Due to this, preferably illustration data which can reduce the frequency of screen switching to reduce the load of the operator without increasing the size of the display unit is data for explaining a method of use of the sewing machine and the audio data is data of explanations corresponding to the illustration data.

3 Claims, 9 Drawing Sheets

(56) References Cited

U.S. PATENT DOCUMENTS

| | | | | |
|---|---|---|---|---|
| 4,531,466 A | * | 7/1985 | Hanyu et al. | 112/470.01 |
| 4,622,907 A | * | 11/1986 | Kimura | 112/102.5 |
| 5,265,026 A | * | 11/1993 | Nishizawa et al. | 700/136 |
| 5,375,063 A | * | 12/1994 | Peck et al. | 700/136 |
| 8,146,521 B2 | * | 4/2012 | Nakamura et al. | 112/102.5 |
| 2008/0229992 A1 | * | 9/2008 | Nakamura et al. | 112/470.03 |
| 2010/0313805 A1 | | 12/2010 | Kishi | |

FOREIGN PATENT DOCUMENTS

| | | |
|---|---|---|
| JP | 9-188954 | 7/1997 |
| JP | 2650380 | 9/1997 |

* cited by examiner

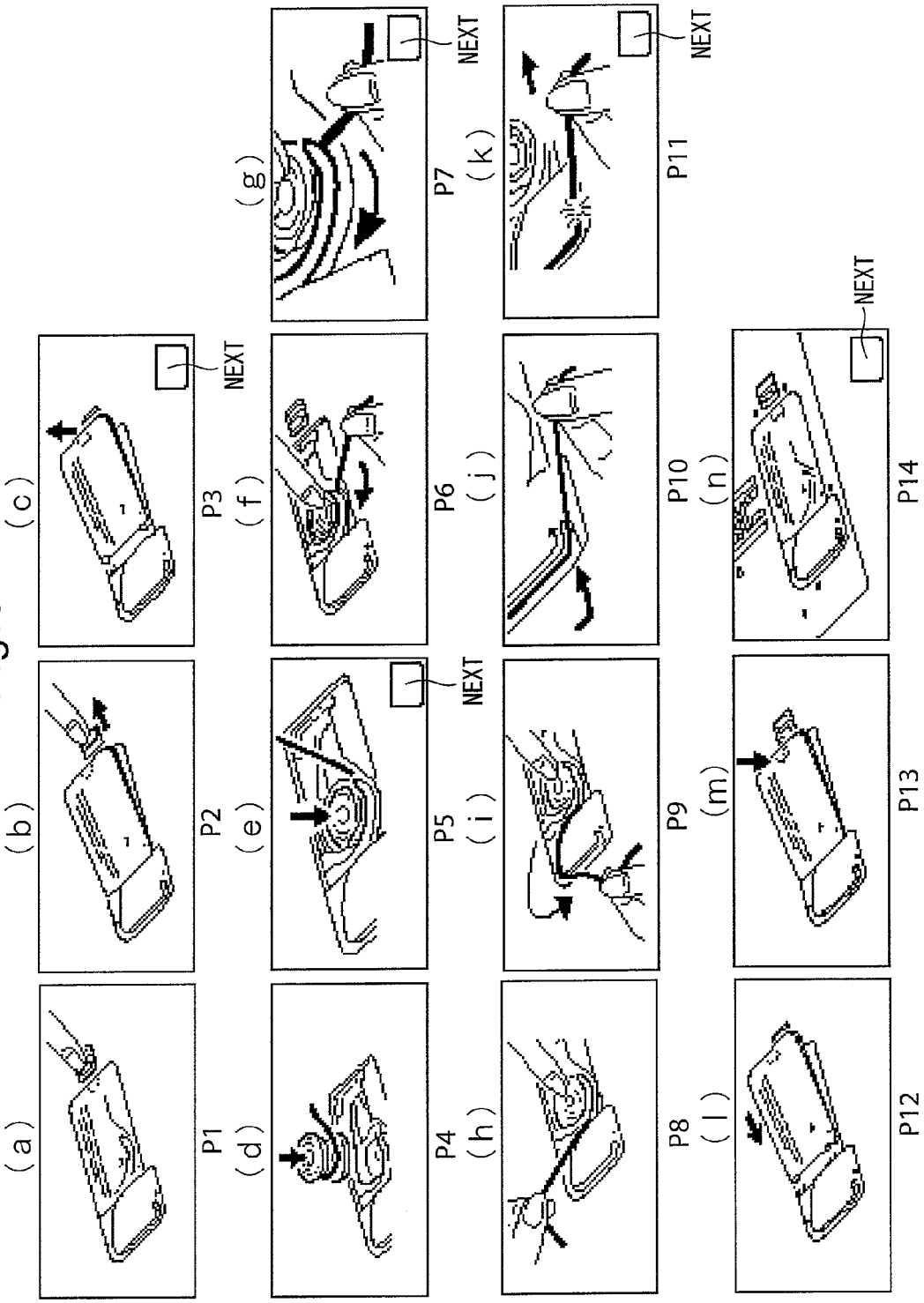

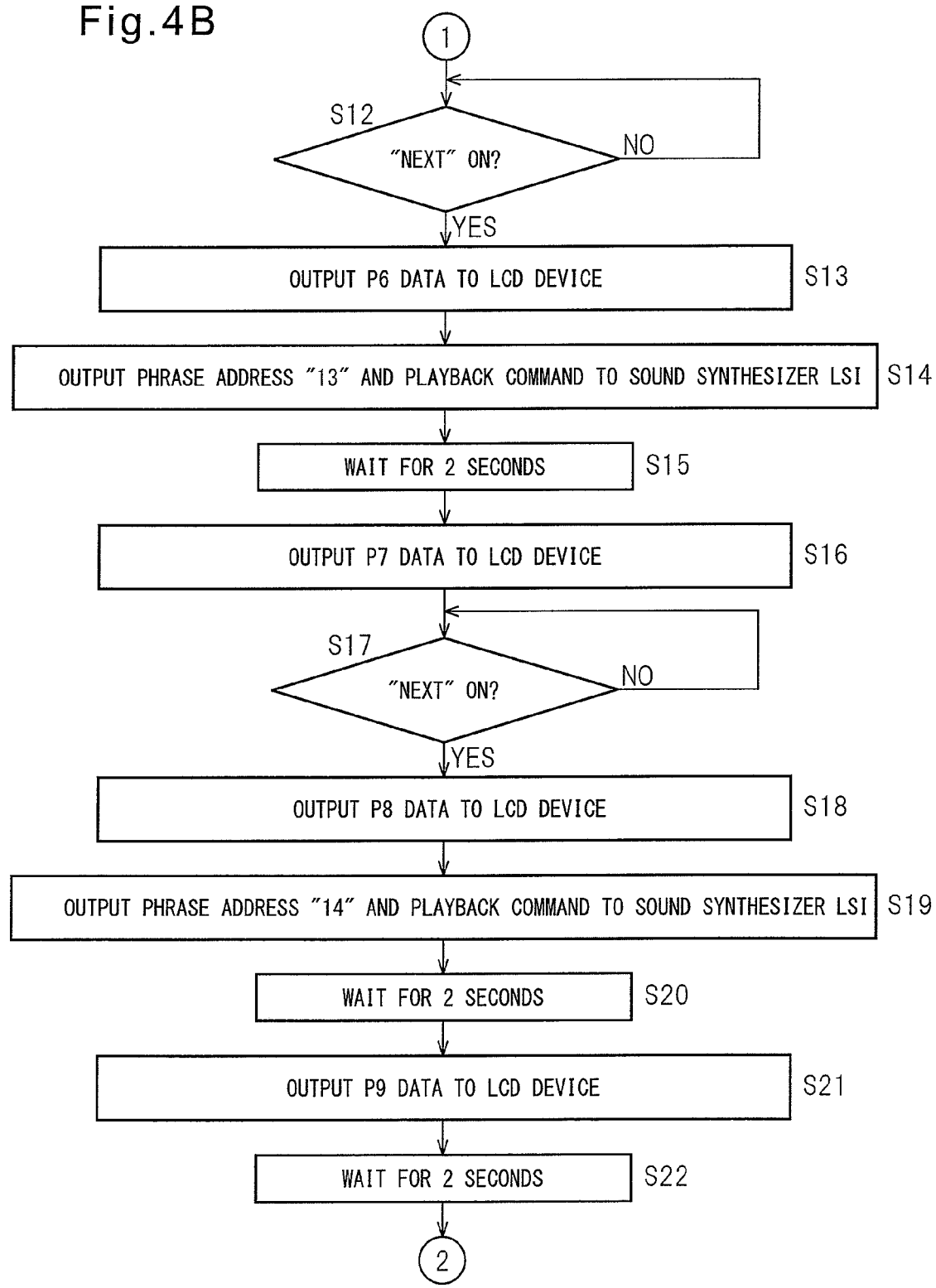

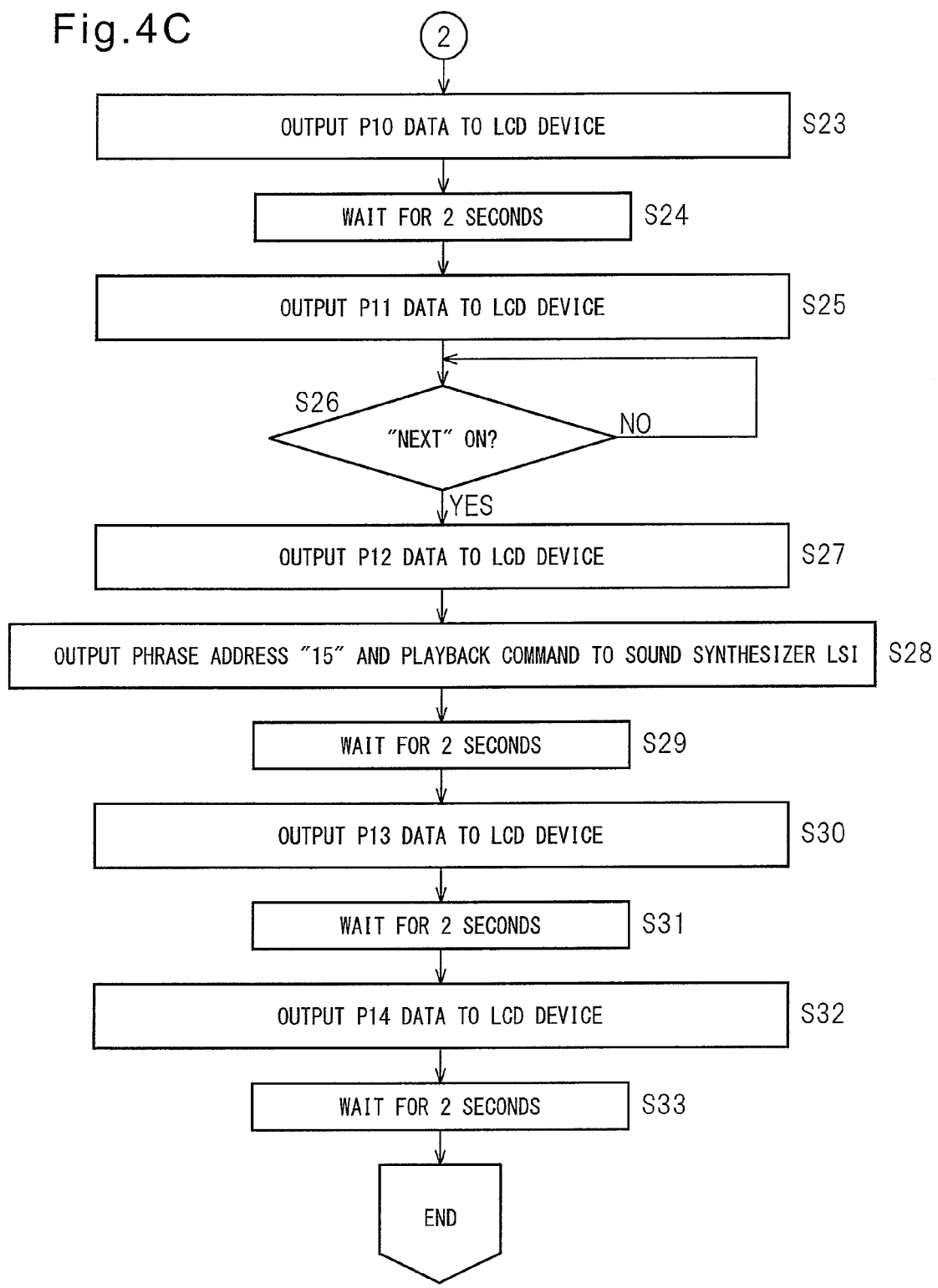

PATTERN AND LETTER

ELECTRONIC SEWING MACHINE

This application is a National Stage Application of PCT/JP2012/051642, filed 26 Jan. 2012, which claims benefit of Serial No. 2011-042256, filed 28 Feb. 2011 in Japan and which applications are incorporated herein by reference. To the extent appropriate, a claim of priority is made to each of the above disclosed applications.

TECHNICAL FIELD

The present invention relates to an electronic sewing machine which moves a needle bar up and down through a sewing machine spindle which is driven by a sewing machine motor of a sewing machine body.

BACKGROUND ART

An electronic sewing machine is provided with a large number of sewing functions, for example, pattern sewing, practical sewing, and other functions. In this regard, as electronic sewing machines increase in sewing functions, the operation becomes complicated and the user has to frequently refer to the instruction manual. Therefore, the load on the user increases and the time taken for operation of the sewing machine becomes longer.

For this reason, in PLT 1, a display unit, for example, a liquid crystal display, which is attached to the sewing machine displays explanations of the sewing machine operation and illustrations relating to the explanations. In this case, the user does not have to refer to the instruction manual.

Further, in recent years, electronic sewing machines which output audio data from a speaker have been on the market. For example, the electronic sewing machine which is disclosed in PLT 2 can notify the user of details of an abnormality by audio and can notify the user of work which should be performed for dealing with the abnormality by audio when an abnormality detector which is provided at a predetermined location of the sewing machine detects an abnormality.

CITATIONS LIST

Patent Literature

PLT 1: Japanese Patent No. 2650380
PLT 2: Japanese Examined Patent Publication No. 1-34638B

SUMMARY OF INVENTION

Technical Problem

Usually, the display unit is provided on the column part between the arm and bed of the sewing machine. The dimensions of the display unit are therefore determined by the dimensions of the column part. Further, the dimensions of the display unit also have an effect on the cost of the electronic sewing machine. For this reason, there are limits to the simultaneous display of illustrations relating to use of the sewing machine and/or explanations relating to use on a single display unit. Therefore, to explain a complicated operation, it is necessary to display a plurality of illustrations and/or explanations on the display unit in succession. The user performs screen switching operations of the display unit several times, so that the operation time becomes considerably long. To reduce the screen switching operations, it may be considered to reduce the size of the illustrations and/or characters of explanations, but there are limits to reduction of the size of the illustrations and/or characters for keeping down the load on the eyes of the user.

Further, in a sewing machine like in PLT 2 which outputs audio when an abnormality occurs, once the user becomes used to the operation of the sewing machine, audio data for notifying abnormalities becomes unnecessary. Further, if abnormalities or mistakes in operation are repeatedly pointed out by audio, some users will find this a nuisance.

The present invention was made in consideration of such a situation and has as its object to provide an electronic sewing machine which can reduce the frequency of screen switching and reduce the load on the user without increasing the dimensions of the display unit.

Solution to Problem

To achieve the above object, according to a first aspect of the invention, there is provided an electronic sewing machine which makes a needle bar move up and down through a sewing machine spindle which is driven by a sewing machine motor of a sewing machine body, comprising an illustration data storage unit which stores a plurality of illustration data, a display unit which displays the illustration data which is stored in the illustration data storage unit, an audio data storage unit which stores audio data which corresponds to the illustration data, and an audio output unit which outputs audio data which is stored in the audio data storage unit and wherein the electronic sewing machine displays the illustration data on the display unit while outputting audio data corresponding to the illustration data from the audio output unit.

According to a second aspect of the invention, there is provided the first aspect of the invention wherein the illustration data is data for explaining a method of use of the sewing machine and the audio data is data of explanations corresponding to the illustration data.

According to a third aspect of the invention, there is provided the first or second aspect of the invention which is further provided with a switch which performs switching to not output audio data corresponding to the illustration data.

Advantageous Effects of Invention

In the first and second aspects of the invention, only illustration data not including almost any text information is displayed on the display unit and explanations corresponding to the displayed illustration data are output as audio. For this reason, the display unit need only display the illustration data, so there is no need to enlarge the display unit. Further, there is no need to display the illustration data small. Furthermore, since an explanation is output as audio, the screen switching operations can be kept to a minimum. Therefore, it becomes possible to reduce the load on the user.

In the third aspect of the invention, it is possible to stop the output of audio data if so requested by the user, so it is possible to further reduce the nuisance to the user.

These objects, features, and advantages of the present invention and other objects, features, and advantages will become further clearer from the detailed description of typical embodiments of the present invention which are shown in the attached drawings.

BRIEF DESCRIPTION OF DRAWINGS

FIGS. 3(a) to 3(n) are views which show illustration data which is displayed on the display unit.

FIG. 4B is a flow chart which shows the operation of an electronic sewing machine.

FIG. 4C is a flow chart which shows the operation of an electronic sewing machine.

DESCRIPTION OF EMBODIMENTS

Below, the attached figures will be referred to so as to explain the embodiments of the present invention. In the following figures, similar members are assigned similar reference signs. To facilitate understanding, these figures are suitably changed in scale.

Figure 1:
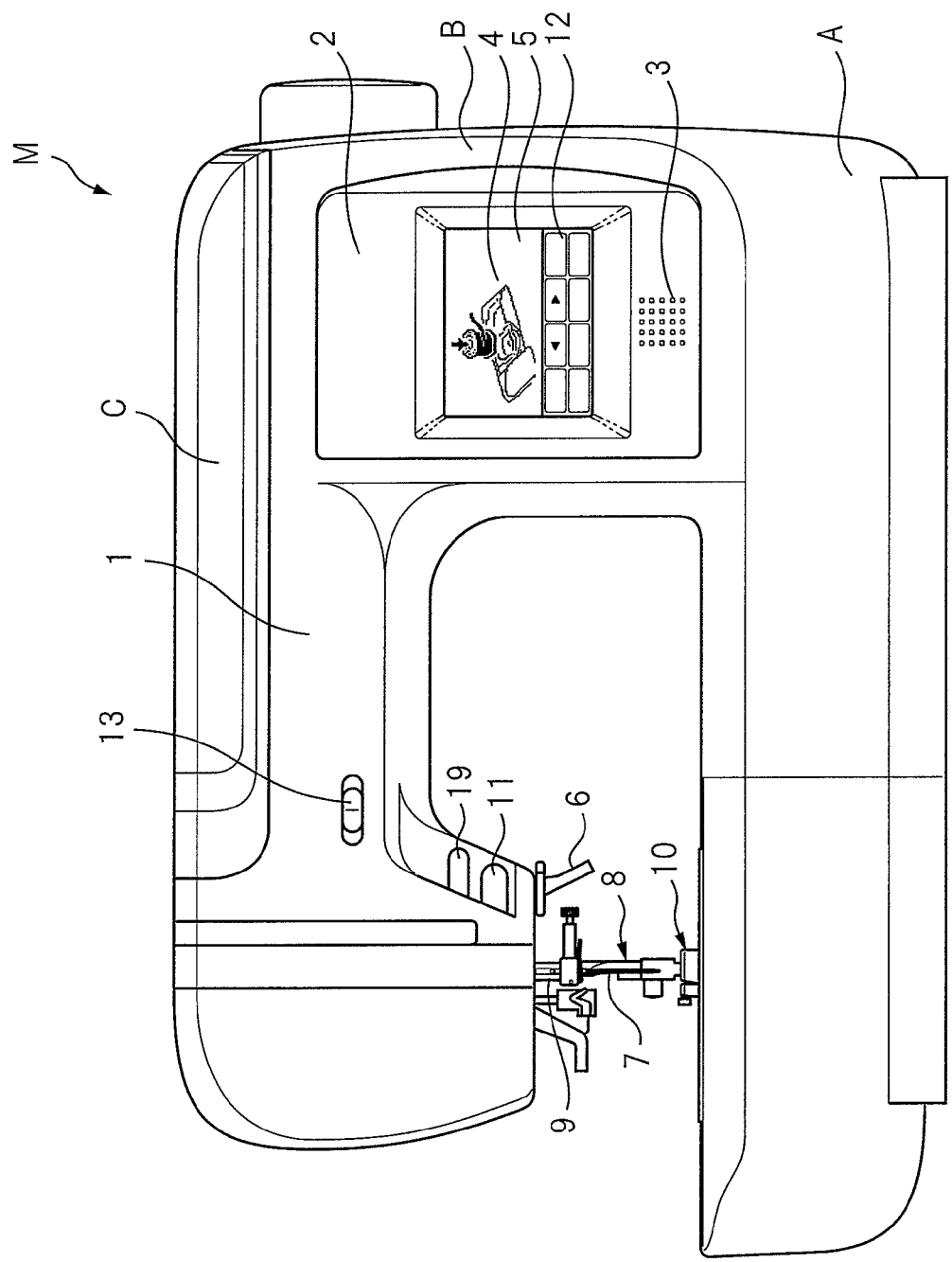
FIG. 1 is a front view of an electronic sewing machine according to the present invention.

FIG. 1 is a front view of an electronic sewing machine according to the present invention. As shown in FIG. 1, an electronic sewing machine M has a bed part A, a column part B which is provided standing up from the left end of the bed part A, and an arm part C which extends from a top end of the column part B to the left so as to face the bed part A. Furthermore, at the bottom end of the arm part C, a needle bar 9 to which a sewing needle 7 is attached is attached to be able to be raised and lowered.

At the right of the needle bar 9, a presser foot lifter 6 is provided. If the user lifts up the presser foot lifter 6, the presser bar 8 rises linked with this and the presser foot 10 which is attached to the presser bar 8 similarly rises. On the contrary, as shown in FIG. 1, if pushing down the presser foot lifter 6, the presser foot 10 also descends and the sewn article (not shown) is pressed.

As shown in FIG. 1, the arm part C is provided with a start/stop button 11 which starts and stops the electronic sewing machine M and a backstitch button 19 which causes a backstitch if pushed. Furthermore, the arm part C is provided with a speed control switch 13 which is slid in the horizontal direction to control the sewing speed of the electronic sewing machine M.

Furthermore, as shown in FIG. 1, the front surface of the electronic sewing machine M is covered by a front cover 1. Further, at part of the front cover 1 corresponding to the column part B, a control panel 2 is provided. At the bottom part of this control panel 2, a speaker aperture 3 is formed. While not shown in FIG. 1, at the back surface of the bottom part of the control panel 2, a later explained speaker 21 is provided. The audio which is output from the speaker 21 is output through the speaker aperture 3 to the outside of the electronic sewing machine M.

Figure 7A:
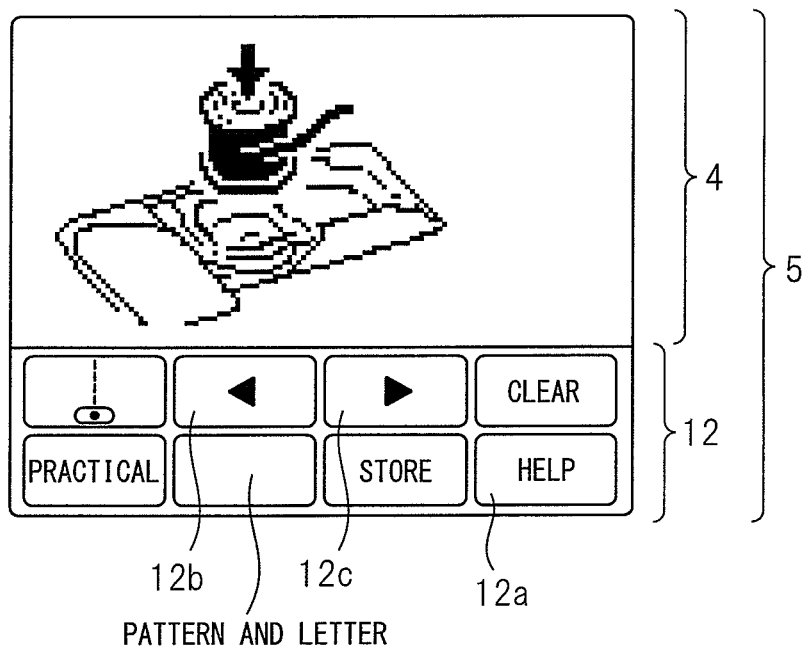
FIG. 7A is a partial enlarged view of a control panel which is shown in FIG. 1.

FIG. 7A is a partial enlarged view of the control panel 2 which is shown in FIG. 1. As shown in FIG. 7A, the control panel 2 is provided with a liquid crystal display device 4 which displays the later explained illustration data and other data.

Below the liquid crystal display device 4, a display panel 12 at which various types of buttons are arranged is provided. The buttons of the display panel 12 are used for performing various operations of the electronic sewing machine M. For example, the buttons 12b, 12c of the display panel 12 are used for selecting one operation from a plurality of operations of the electronic sewing machine which are displayed on the menu screen. One button 12a of the display panel 12 performs the role of a switch by which the user switches the operating sounds and error sounds of the electronic sewing machine M.

Note that, a transparent touch panel 5 is arranged on the top surface of the liquid crystal display device 4 and display panel 12. Therefore, if the touch panel 5 corresponding to a desired portion of the liquid crystal display device 4 and display panel 12 is pressed, an operation corresponding to that portion is performed.

Figure 2:
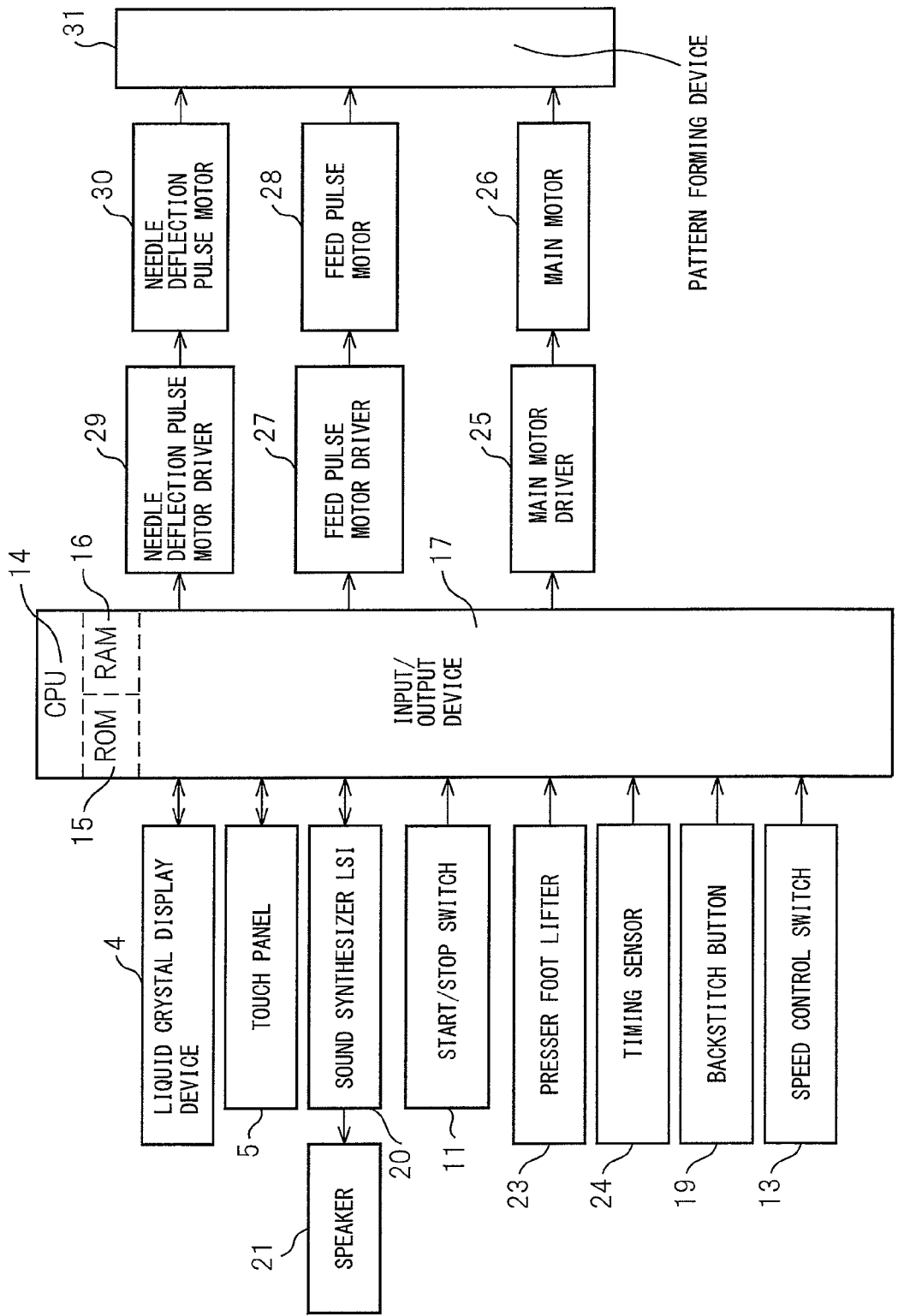
FIG. 2 is a functional block diagram of a control unit of an electronic sewing machine which is shown in FIG. 1.

FIG. 2 is a functional block diagram of a control unit of the electronic sewing machine which is shown in FIG. 1. This control unit is assembled inside the electronic sewing machine M. The control unit includes the ROM 15 which stores pattern data which is used when selecting a pattern, illustration data which is used when explaining the method of use of the sewing machine, and various types of programs. The CPU 14 runs various types of programs which are stored in the ROM 15, while the RAM 16 is used to temporarily store data at the time of processing of the CPU 14. These CPU 14, ROM 15, and RAM 16 are connected with each other by an input/output device 17.

The liquid crystal display device 4 and the touch panel 5 are connected to the input/output device 17. Furthermore, the input/output device 17 is connected to a sound synthesizer LSI 20 including the later explained audio data. The audio data of the sound synthesizer LSI 20 is output through the speaker 21.

Table 1 is a table which shows the audio data which is stored in the sound synthesizer LSI 20. If the input/output device 17 outputs a phrase address and playback command to the sound synthesizer LSI 20, audio data (phrase content) corresponding to the phrase address is output from the speaker 21.

TABLE 1

| No. | Phrase address | Content of phrase (audio data) |
|---|---|---|
| 1 | A00 | |
| 2 | A01 | Lower presser |
| . | . | . |
| 18 | A11 | Push bobbin cover release lever to right to detach cover |
| 19 | A12 | Set bobbin to turn counterclockwise and insert in bobbin case |
| 20 | A13 | Lightly press bobbin by right hand and hook thread inside groove by left hand |
| 21 | A14 | Run thread along groove from top to bottom, pull to right, and cut |
| 22 | A15 | Insert tab at left side of bobbin cover into groove and lightly press right side |
| . | . | . |
| 34 | A21 | Key input sound 1 |
| . | . | . |
| 37 | A24 | Caution sound 1 |
| . | . | . |

As shown in Table 1, the sound synthesizer LSI 20 stores a plurality of audio data (phrase contents) corresponding to the phrase addresses. Further, these audio data, as explained later, are suitably linked with one or more illustration data. The audio data which is shown in Table 1 is a group of explanations for explaining the operation for setting the lower thread for example. Further, as shown by the phrase addresses A21 and A24 of Table 1, the sound synthesizer LSI 20 stores a key input sound 1 which is output when pressing the touch panel 5 and a caution sound 1 which is output when the user makes a mistake in operation.

Referring again to FIG. 2, the input/output device 17 is further connected with a start/stop button 11, backstitch button 19, speed control switch 13, presser lifting switch 23 which outputs a predetermined signal when the presser foot lifter 6 is at the upper position or the lower position, and timing sensor 24 which detects movement of the sewing machine spindle (not shown).

Furthermore, the main motor 26 which rotates the spindle (not shown) of the electronic sewing machine M to drive the needle bar 9 is connected through the main motor driver 25 to the input/output device 17. Similarly, the feed pulse motor 28 which controls the amount of feed of the sewn article by a feed gear (not shown) is connected through the feed pulse motor driver 27 to the input/output device 17. Furthermore, the needle deflection pulse motor 30 which makes the needle bar 9 move to the left and right is connected through the needle deflection pulse motor driver 29 to the input/output device 17. Furthermore, as shown in FIG. 2, these motors 26, 28, and 30 are connected to the pattern forming device 31 for forming stitch patterns.

FIG. 3(a) to FIG. 3(n) are views showing illustration data P1 to P14 which are stored in the ROM 15 and are displayed on the liquid crystal display device 4. These illustration data P1 to P14 are used to explain the operation of setting the lower thread at the electronic sewing machine M. As can be seen from FIG. 3(a) to FIG. 3(n), the illustration data P1 to P14 are data substantially relating to only illustrations and do not include much text information.

Figure 4A:
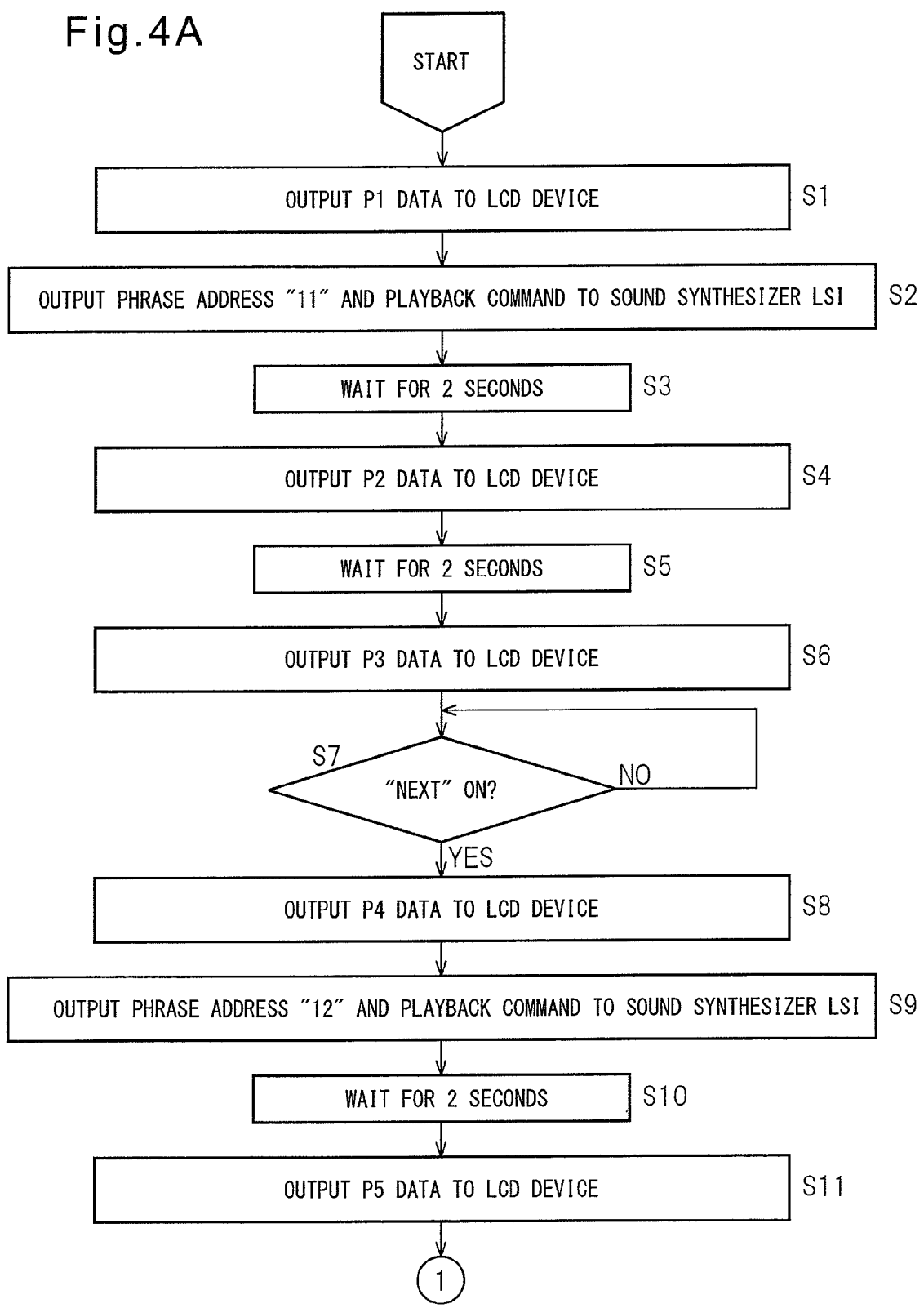
FIG. 4A is a flow chart which shows the operation of an electronic sewing machine.

Furthermore, FIG. 4A to FIG. 4C are a flow chart which shows the operation of the electronic sewing machine when selecting the operation of setting the lower thread. Below, referring to FIG. 3(a) to FIG. 3(n) and FIG. 4A to FIG. 4C, the operation of the electronic sewing machine M when selecting the operation of setting the lower thread will be explained.

First, the user selects the operation of setting the lower thread from a not shown menu screen. Due to this, at step S1 of FIG. 4A, the illustration data P1 which is stored in ROM 15 (see FIG. 3(a)) is displayed on the liquid crystal display device 4. Further, at step S2, the phrase address A11 which is linked with the illustration data P1 and its playback command are output to the sound synthesizer LSI 20. Due to this, the speaker 21 outputs the audio "push bobbin cover release lever to right to detach cover".

At step S3, a predetermined time, for example, 2 seconds, is waited. This predetermined time is a time sufficient for outputting one audio data. Further, at step S4, the illustration data P2 (see FIG. 3(b)) is output to the liquid crystal display device 4. After that, after waiting for 2 second at step S5, the illustration data P3 (see FIG. 3(c)) is output to the liquid crystal display device 4 at step S6.

As can be seen by referring to FIG. 3(c), the illustration data P3 includes the region "Next". As explained above, the liquid crystal display device 4 has a touch panel 5 arranged on it. If the user presses part of the touch panel 5 corresponding to "Next" of the illustration data P3, the routine proceeds to step S8.

At step S8, the illustration data P4 (see FIG. 3(d)) is displayed on the liquid crystal display device 4. Further, at step S9, the phrase address A12 which is linked with the illustration data P4 and its playback command are output to the sound synthesizer LSI 20. Due to this, the speaker 21 outputs the audio "set bobbin to turn counterclockwise and insert in bobbin case".

Further, after waiting for 2 seconds at step S10, the illustration data P5 (see FIG. 3(e)) is displayed at the liquid crystal display device 4. Further, if the user selects part of the touch panel 5 corresponding to "Next" of the illustration data P5, the routine proceeds to step S13.

At step S13, the illustration data P6 (see FIG. 3(f)) is displayed on the liquid crystal display device 4. Further, at step S14, the phrase address A13 which is linked with the illustration data P6 and its playback command are output to the sound synthesizer LSI 20. Due to this, the speaker 21 outputs the audio "lightly press bobbin by right hand and hook thread inside groove by left hand."

Further, after waiting for 2 seconds at step S15, the illustration data P7 (see FIG. 3(g)) is displayed on the liquid crystal display device 4.

Further, if the user presses the part of the touch panel 5 corresponding to "Next" of the illustration data P7, the routine proceeds to step S18.

At step S18, the illustration data P8 (see FIG. 3(h)) is displayed on the liquid crystal display device 4. Further, at step S19, the phrase address A14 which is linked with the illustration data P8 and its playback command are output to the sound synthesizer LSI 20. Due to this, the speaker 21 outputs the audio "run thread along groove from top to bottom, pull to right, and cut."

Further, after waiting for 2 seconds at step S20, the illustration data P9 (see FIG. 3(i)) is displayed on the liquid crystal display device 4. After waiting for 2 seconds at step S22, the illustration data P10 (see FIG. 3(j)) is displayed on the liquid crystal display device 4. Furthermore, after waiting for 2 seconds, the illustration data P11 (see FIG. 3(k)) is displayed on the liquid crystal display device 4. Further, if the user presses part of the touch panel 5 corresponding to "Next" of the illustration data P11, the routine proceeds to step S27.

At step S27, the illustration data P12 (see FIG. 3(l)) is displayed on the liquid crystal display device 4. Further, at step S28, the phrase address A15 which is linked with the illustration data P12 and its playback command are output to the sound synthesizer LSI 20. Due to this, the speaker 21 outputs the audio "insert tab at left side of bobbin cover into groove and lightly press right side bobbin".

Further, after waiting for 2 seconds at step S29, the illustration data P13 (see FIG. 3(m)) is displayed at the liquid crystal display device 4. After waiting for 2 seconds at step S31, the illustration data P14 (see FIG. 3(n)) is displayed at the liquid crystal display device 4. Furthermore, after waiting for 2 seconds at step S33, the processing is ended.

By this series of the step S1 to step S33, the user can easily set the lower thread at the electronic sewing machine M in accordance with the illustration data P1 to P14 which is displayed at the liquid crystal display device 4 and audio data corresponding to the phrase addresses A11 to A15 which are output from the speaker 21.

When explaining the setting of the lower thread in the present invention to the user, only illustration data P1 to P14 not containing almost any text information is displayed at the liquid crystal display device 4 and explanations corresponding to the displayed illustration data P1 to P14 are output as audio data corresponding to the phrase addresses A11 to A15.

Therefore, in the present invention, the liquid crystal display device 4 need only successively display the illustration data P1 to P14, so the liquid crystal display device 4 does not have to be made larger. Further, there is no need to display the illustration data P1 to P14 small. Furthermore, the explanation is output as audio data, so compared with when displaying the explanation at the liquid crystal display device 4, the screen switching operation of the liquid crystal display device 4 can be kept to a minimum. Therefore, it will be understood that the load on the user can be greatly reduced.

Figure 5:
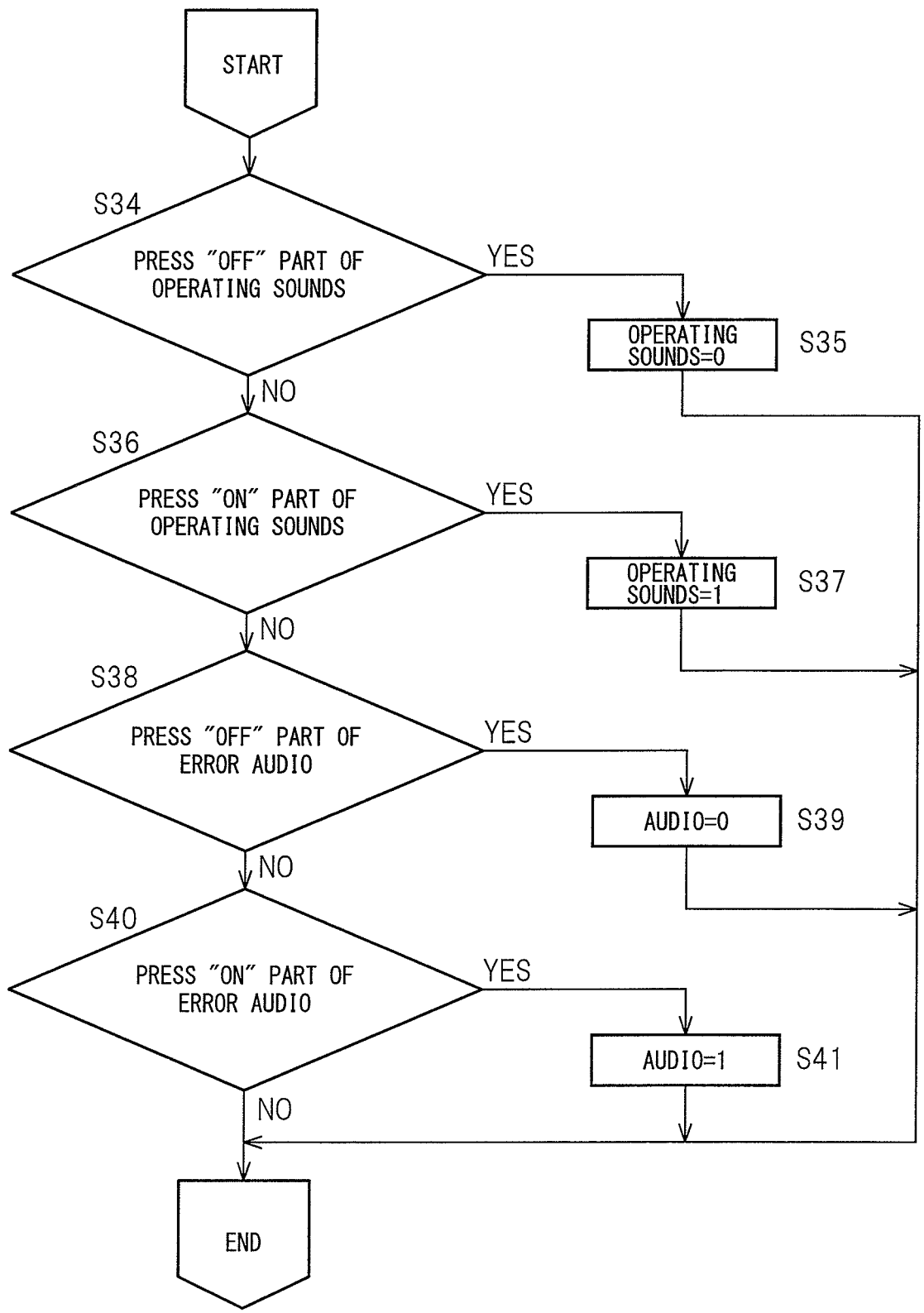
FIG. 5 is a flow chart for explaining a switching operation by a switch.
Figure 7B:
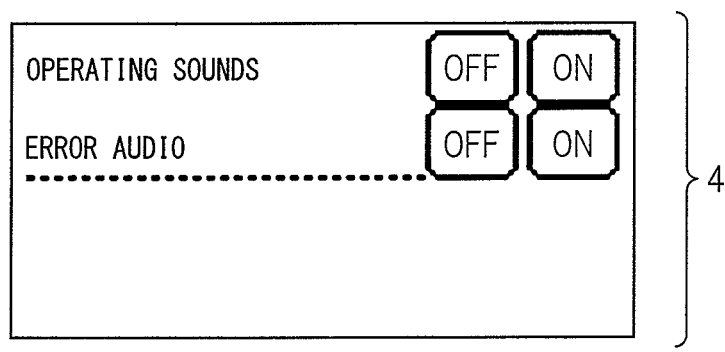
FIG. 7B is a view for explaining details of switching by the switch.

In this regard, FIG. 7B is a view which shows the switch for explaining the details of the switching operation by the switch. If pressing the button 12a which is shown in FIG. 7A, the screen which is shown in FIG. 7B is displayed at the liquid crystal display device 4. Further, FIG. 5 is a flow chart for explaining a switching operation by the switch. Below, referring to FIG. 5 and FIG. 7B, the switching operation of the switch will be explained.

First, at step S34 of FIG. 5, it is judged if the user has pressed the "OFF" part of the operating sounds as shown in FIG. 7B. If pressed, "0" is set at the "operating sounds" of the RAM 16 and the processing ends. In this case, audio data corresponding to the phrase address A21 (key input sound) is not output.

When it is judged at step S34 that the "OFF" part of the operating sound is not pressed, the routine proceeds to step S36 where it is judged if the user has pressed the "ON" part of the operating sounds. If pressed, "1" is set at the "operating sounds" of the RAM 16. In this case, when explaining the setting of the lower thread, the audio data (key input sound) which corresponds to the phrase address A21 is output.

Furthermore, when at step S36 the "ON" part of the operating sound is not pressed, the routine proceeds to step S38. At step S38, it is judged if the user has pressed the "OFF" part of the error sounds. If it is pressed, "0" is set at "audio" of RAM 16. In this case, for example, when explaining the setting of the lower thread, none of the audio data corresponding to the phrase addresses A11 to A15 is output. Further, even when the user makes a mistake in operation, for example, forgets the operation of lowering the presser foot 10, the audio data "lower presser" corresponding to the phrase address A01 is also not output.

Furthermore, at step S38, if it is judged that the "OFF" part of the error sounds is not pressed, the routine proceeds to step S40. At step S40, it is judged if the user has pressed the "ON" part of the error sounds. If pressed, "1" is set at "audio" of the RAM 16. In this case, when for example explaining setting of the lower thread, audio data corresponding to the phrase addresses A11 to A15 is output as explained above. If the user makes a mistake in operation, audio data corresponding to the phrase address A01 corresponding to details of the mistake in operation is output.

Figure 6:
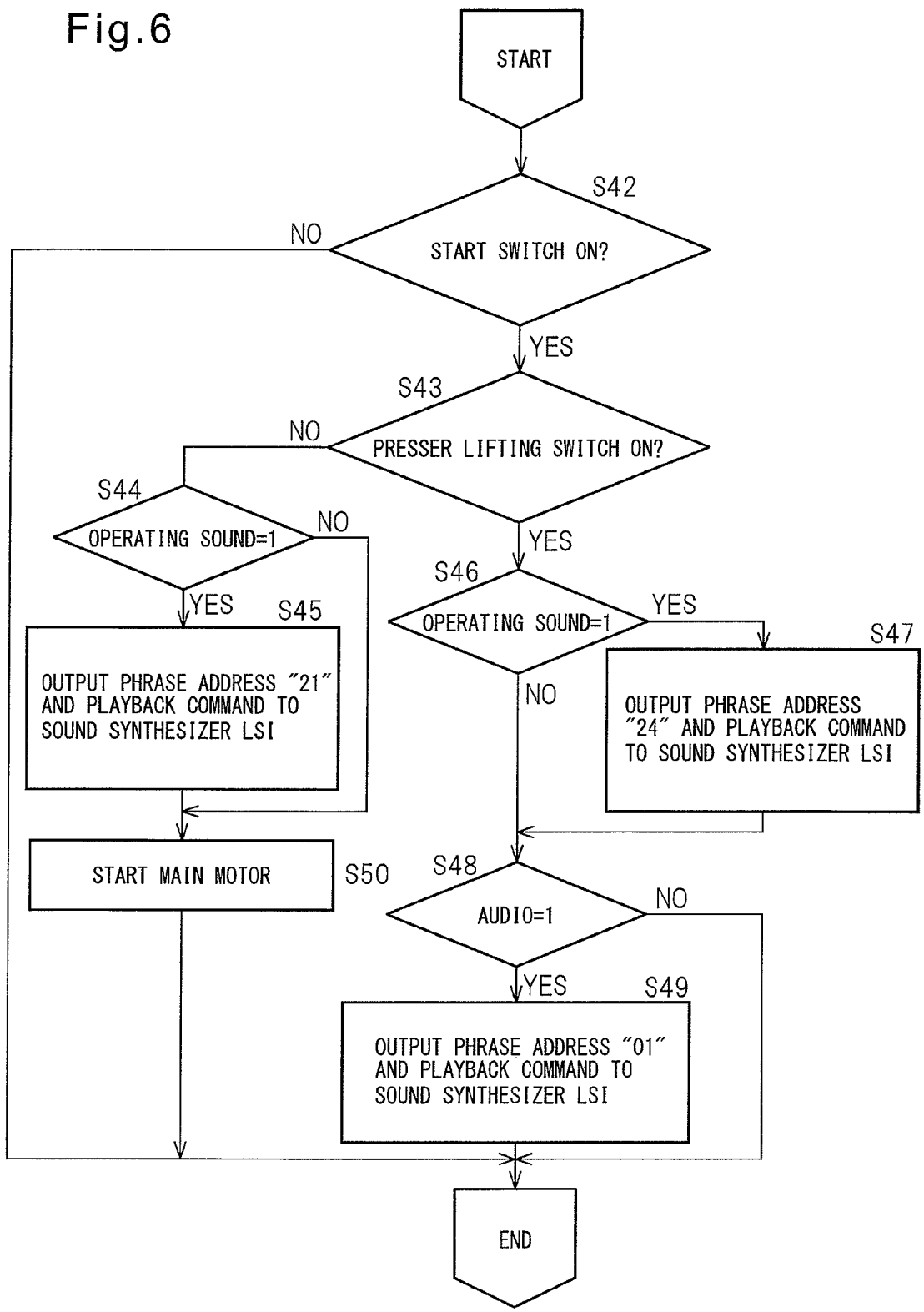
FIG. 6 is a flow chart which shows the operation of an audio output unit after a switching operation according to FIG. 5.

Furthermore, FIG. 6 is a flow chart which shows the operation of the audio output unit after the switch operation according to FIG. 5 is performed. At step S42 of FIG. 6, it is judged if the start/stop button 11 has been pressed. If pressed, the routine proceeds to step S43.

At step S43, it is judged if the presser lifting switch 23 has been pressed. If it is judged that the presser lifting switch 23 is not pressed, the routine proceeds to step S44. At step S44, it is judged if "1" is set at "operating sounds" of the RAM 16. When it is set, the routine proceeds to step S45, while when "1" is not set, the routine proceeds to step S50. At step S45, the phrase address A21 and its playback command are output to the sound synthesizer LSI 20. Due to this, the speaker 21 outputs the "key input sound 1" and, at step S50, the main motor 26 is driven.

As opposed to this, when it is judged if the presser lifting switch 23 is pressed, the routine proceeds to step S46 where it is judged if "1" is set at the "operating sounds" of the RAM 16. Further, when "1" is set at the "operating sounds", the phrase address A24 and its playback command are output to the sound synthesizer LSI 20. Due to this, the speaker 21 outputs the "caution sound 1".

If "1" is not set at the "operating sounds" of the RAM 16, the routine proceeds to step S48. At step S48, it is judged if "1" is set at "audio" of the RAM 16. Further, when "1" is set at "audio", at step S49, the phrase address A01 and its playback command are output to the sound synthesizer LSI 20. Due to this, the speaker 21 outputs the audio "lower presser".

In this way, in the present invention, it is possible to switch ON/OFF the operating sounds and switch ON/OFF the error sounds in accordance with the desire of the user. Usually, when the user is familiar with the operation of the electronic sewing machine M, the user does not require operating sounds and/or error sounds. In the present invention, it is possible to perform switching so as to not output audio data in accordance with the desire of the user. Therefore, it becomes possible to further reduce the nuisance to the user.

Typical embodiments were used to explain the present invention, but it will be understood that a person skilled in the art could make the above-mentioned changes and various other changes, deletions, and additions without departing from the scope of the present invention.

REFERENCE NOTATIONS LIST 1 front cover
2 control panel
3 speaker aperture
4 liquid crystal display device (display unit)
5 touch panel
6 presser foot lifter
7 sewing needle
8 presser bar
9 needle bar
10 presser foot
12 display panel
12a button (switch)
13 speed control switch
14 CPU
15 ROM (illustration data storage unit)
16 RAM
17 input/output device
19 backstitch button
20 sound synthesizer LSI (audio data storage unit)
21 speaker (audio output unit)
23 presser lifting switch
26 main motor
28 feed pulse motor
30 needle deflection pulse motor
31 pattern forming device
A bed
B column part
C arm part
M electronic sewing machine

The invention claimed is:

1. An electronic sewing machine which makes a needle bar move up and down through a sewing machine spindle which is driven by a sewing machine motor of the sewing machine body, comprising:
    an illustration data storage unit which stores illustration data for explaining an operation of said electronic sewing machine,
    said illustration data storage unit storing a plurality of groups of illustration data, each of said plurality of groups containing a plurality of illustration data, and
    further comprising:
    a display unit which displays said illustration data which is stored in said illustration data storage unit, wherein the display unit is arranged on a column part between a bed part of the electronic sewing machine and an arm part to which a sewing needle is attached,
    an audio data storage unit which stores audio data which corresponds to said illustration data, and
    an audio output unit which outputs audio data which is stored in said audio data storage unit, wherein the plurality of illustration data of one group among the plurality of groups which are stored in said illustration data storage unit is displayed in a predetermined order on said display unit every predetermined time, when first illustration data of said one group is displayed on said display unit, audio data which corresponds to said first illustration data being output from said audio output unit, said predetermined time being a time sufficient for outputting said audio data, and wherein when all illustration data of said one group has been displayed, the plurality of illustration data of another group is displayed in a predetermined order on said display unit every said predetermined time, when first illustration data of said another group is displayed on said display unit, audio data which corresponds to said first illustration data being output from said audio output unit.

2. The electronic sewing machine as set forth in claim 1, wherein said illustration data is data for explaining a method of use of said sewing machine and said audio data is data of explanations corresponding to said illustration data.

3. The electronic sewing machine as set forth in claim 1, further comprising a switch which performs switching to not output audio data corresponding to said illustration data.

* * * * *